June 23, 1959 A. WHARTON 2,891,617

PULSING TIMER

Filed March 29, 1955 2 Sheets-Sheet 1

*INVENTOR.*
ARMISTEAD WHARTON
*BY* Francis E Blake
ATTORNEY

June 23, 1959 A. WHARTON 2,891,617

PULSING TIMER

Filed March 29, 1955 2 Sheets-Sheet 2

*INVENTOR.*
ARMISTEAD WHARTON
*BY* Francis E. Blake
ATTORNEY

United States Patent Office 2,891,617

Patented June 23, 1959

2,891,617

PULSING TIMER

Armistead Wharton, Rochester, N.Y., assignor, by mesne assignments, to General Dynamics Corporation, a corporation of Delaware Application March 29, 1955, Serial No. 497,760

4 Claims. (Cl. 161—1)

The present invention relates to timing devices.

In applicant's copending application, Serial No. 430,548, now Patent No. 2,814,683, filed May 18, 1954, a pulsing timer is described for producing electrical impulses at predetermined intervals in accordance with the passage of time and as specifically developed for automatically timing telephone calls.

For timing the duration of a telephone call, it may be satisfactory to record the duration of the call by discrete electrical impulses regularly recurring at intervals. Such timing apparatus must be instantly resettable at the end of each call to a reset starting position ready to commence the timing of a succeeding call. Under some conditions of operation, when using the timer with automatic dial systems and automatic toll ticketing apparatus, it may be desirable to arrange that the time interval from the instant that the timer is started from the reset or starting position to the instant that the first timing pulse is generated is slightly greater or less than each of the succeeding time intervals between timing pulses occurring at the end of regularly recurring time intervals. The different first timed interval thus obtained thereby provides a period of grace in order that the calling party may be assured that he has been connected with the desired called party. For purposes of telephone supervision and control, it may also be desirable to produce a first electrical control impulse a short interval after the starting of the timing operation and independently of the subsequently produced timing pulses.

It is a principal object of the present invention to provide an improved timing device having a simplified mechanism for producing electrical impulses in accordance with the passage of time with a first timing impulse produced after the start of the timing operation occurring after a different interval of time than the interval of time between similar successively recurring timing impulses.

Another object of the invention is to provide an improved timing device of the character described adapted to produce a first control impulse after an adjustable determined short interval of time followed by the successive production of timing impulses including a first timing impulse occurring a different interval of time after the start of the timing operation than the time interval between all following successively produced and similar timing impulses.

Another object of the invention is to provide an improved timing device having a simplified adjustment for adjustably predetermining the time intervals between the start of the timing operation and the occurrence of the control pulse and the first timing pulse relative to the occurrence of all successive timing impulses.

The invention in its simplest form includes in combination, a clock motor, a timing cam movable from a starting position, and a lost motion connection between the clock motor and the cam so that, upon start of the timing operation, a different interval of time will be obtained between movement of the timing cam to a position for actuating an electric switch than the successive intervals of time during continued movement of the cam to positions for reoperating the electric switch. In order to provide an additional pulse which may be referred to as a control pulse occurring before the occurrence of the first mentioned timing impulse, as described in the preceding sentence, an additional switch operating cam may be provided for connection directly to the clock motor with the lost motion connection interposed between the additional cam and the first mentioned timing cam referred to in the preceding sentence.

Further objects and the attending advantages of the invention will be apparent with reference to the following specification and drawings in which.

Figure 1:
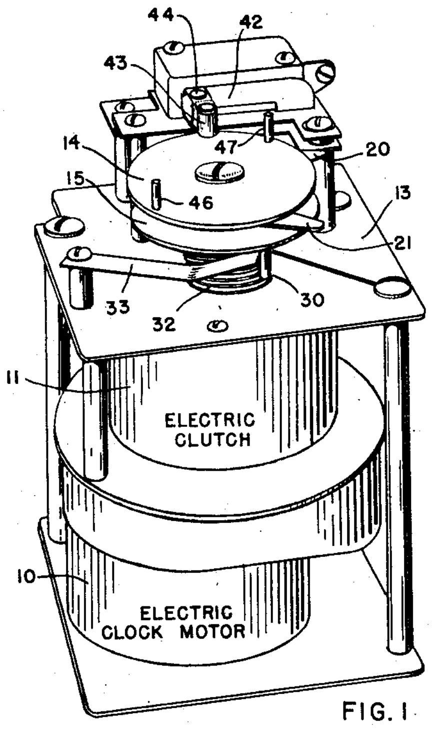
Fig. 1 is a perspective elevation of the timing device of the invention.

Referring to Figures 1–4 of the drawings, the timing device includes an electric clock motor 10 connected in any suitable manner by an electric clutch 11 to produce rotation of a shaft 12 in the counterclockwise direction whenever the clock 10 and clutch 11 are energized. It should be understood that the electric clock motor and clutch may be replaced by a mechanical clock motor and clutch without departing from the spirit of the invention. At the start of the timing operation, the electric clutch 11 is energized to thereby connect the previously operating clock motor 10 to cause the aforementioned counterclockwise rotation of the timing shaft 12.

The timing shaft 12 is suitably journaled on a supporting base 13. A first movable element or timing cam 14 is fastened by means of the screw 9 to be rotatable with the shaft 12. A second timing cam 15 is rotatably journaled upon the shoulder 16 of the shaft 12 and is therefore freely rotatable relative to the shaft 12. The previously mentioned first timing cam 14, as secured to the shaft 12 by means of the screw 9, serves to clamp adjustable lost motion fingers 20 and 21 between washers 22 and 23 and the shoulder 17 of the shaft 12 so that the lost motion fingers 20 and 21 will also be rotatable with the first timing cam 14 and the shaft 12. By loosening the screw 9 the angular positions of the lost motion fingers 20 and 21 relative to the shaft 12 may be adjusted.

The previously mentioned second timing cam 15, which is freely rotatable about the shaft 12, is provided with an upstanding pin 25 positioned in a segment of the arc between the opposing surfaces 26 and 27 of the adjustable lost motion fingers 20 and 21. Thus, a first counterclockwise rotation of the first timing cam 14 will not cause a similar counterclockwise rotation of the second timing cam 15 until the upstanding pin 25 is engaged by the surface 27 of the lost motion finger 21. Similarly, the clockwise rotation of the first timing cam 14 will not cause a similar clockwise rotation of the second timing cam 15 until the surface 26 of the lost motion finger 20 engages the upstanding pin 25 of the second cam 15. Thus, in effect, a lost motion connection between timing cams 14 and 15 is provided and the amount of the lost motion is determined by the angular distance between the opposing surfaces 26 and 27 of the lost motion fingers 20 and 21 as adjustably predetermined by the initial setting of the lost motion fingers 20, 21, previously described.

The underside of the second timing cam 15 is provided with a pair of oppositely positioned depending pins 30 and 31. A helical spring 32 normally tends to rotate the shaft 12 together with the timing cams 14 and 15 in a clockwise direction back to a reference position with one of the depending pins 30 or 31 contacting the end of the spring finger stop member 33. The helical spring 32 is connected by means of a friction clutch (not shown in detail) of any suitable type to be wound to a predetermined tension by the counterclockwise rotation of the timing shaft 12. After the timing shaft 12 has rotated by a sufficient amount to fully wind the helical spring 32, the friction clutch, generally shown at 34, effects a slip connection permitting the timing shaft 12 to continue to rotate in the counterclockwise direction without further winding of the helical spring 32. In moving in the counterclockwise direction the depending pins 30 and 31 of the second timing cam 15 ride-up on the inclined surface 35 of the spring stop member 33 in such manner that the counterclockwise movement of the timing cams 14, 15 and the timing shaft 12 is not prevented by the stop member 33.

Electric impulse generating switches are shown at 40 and 41. The upper electric switch 40 has an operating arm 42 to which is secured an operating roller 43 connected thereto by a pivotal connection 44 and spring 45. The spring 45 normally positions the contact roller 43, as shown in Figure 1 of the drawings, so that as either one of the upstanding pins 46 and 47 of the first timing cam 14 pass the contact roller 43 during counterclockwise rotation of the timing cam 14, the switch arm 42 is depressed to momentarily close the contacts of the electric switch 40. When the timing cam 14 moves in the clockwise direction back to the respective starting position, the contact roller 43 is pivoted about the pivot point 44 against the tension of the spring 45 so that the switch arm 42 is not depressed during clockwise movement of the timing cam 14.

The lower electrical switch 41 is mounted in a position to be operated by the depending pins 30 and 31 of the second timing cam 15 during counterclockwise movement of the said timing cam 15. The lower electric switch 41 is similarly provided with the roller contact 48 pivotally connected at 49 to the operating switch arm 50, and a spring 51 is also provided so that the operation of the lower switch 41 is the same as the previously described operation of the upper switch 40 except that the lower switch 41 is, of course, operated by counterclockwise movement of the second timing cam 15.

Figure 5:
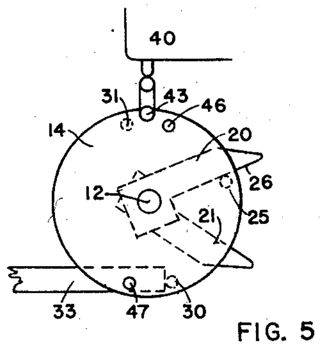
Fig. 5 is a diagrammatic view showing the relative positions of the timing cams and lost motion connection at the start of a timing operation.
Figure 6:
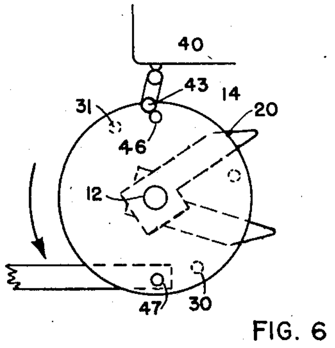
Fig. 6 is a view similar to Fig. 5 but showing the parts in the position at the occurrence of the first control pulse.

It is believed that a description of the timing device of the invention will be more readily understood with reference to the diagrammatic illustrations provided by Figures 5–8 of the drawings. Figure 5 of the drawings shows the timing cams and lost motion connection in the rest position at the starting, or reference point, with the first cam 14 urged by the helical spring 32 in the clockwise direction together with the lost motion fingers 20 and 21 transmitting the force of the helical spring 32 from the surface 26 of the lost motion finger 20 through the upstanding pin 25 to the second timing cam 15, thereby engaging the lower pin 30 of the second timing cam 15 against the spring stop 33. With the timing cam in the rest position, as shown in Figure 5 of the drawings, the electric clutch 11 may be energized to connect the continuously rotating clock motor 10 to rotate the timing shaft 12 and the first timing cam 14 in the counterclockwise direction. As the first timing cam 14 rotates from the position of Figure 5 to the position of Figure 6, one of the upper pins 46 or 47 of the timing cam 14 engages the switch contact roller 43 to close the contacts of the switch 40. It will be seen that very little rotation of the first timing cam 14 from the position of Figure 5 to the position of Figure 6 is required before the first control pulse from the electric switch 40 is produced.

Figure 7:
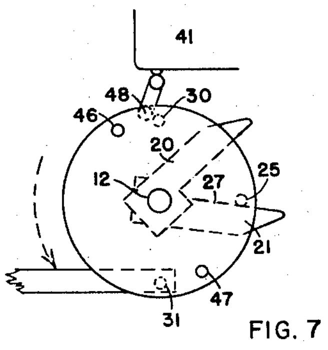
Fig. 7 is a view similar to Figs. 5 and 6 but with the parts in the position at the occurrence of the first timing pulse.

Continued rotation of the upper timing cam 14, which rotates in unison with the timing shaft 12 and the lost motion fingers 20 and 21, will cause the surface 27 of the lost motion finger 21 to engage the upstanding pin 25 of the lower timing cam 15 thus starting the lower cam 15 to rotate from the position shown in Figure 5 of the drawings to the position shown in Figure 7 of the drawings with the depending pin 30 contacting the roller contact 48 of the lower electric switch 41 to close the contacts of switch 41 and produce the first minute pulse. In view of the lost motion between the rotation of the upper timing cam 14 and the lower timing cam 15, the elapsed time from the start of the timing operation until the first closure of switch contacts 41 by pin 30 will be different from the elapsed time for subsequent operation of the switch 41 by either depending pin 31 or 30 during continued counterclockwise rotation of the lower timing cam 15 producing subsequent timing pulses. It should also be apparent that since the depending pins 30 and 31 of the second timing cam 15 are diametrically opposed, the continued counterclockwise rotation of the lower timing cam 15 will cause periodic closure of switch contacts 41 at regularly recurring time intervals. During the continued counterclockwise rotation of the timing cams 14 and 15, the switch 40 will also be periodically closed by the rotation of the diametrically mounted contact pins 46 and 47 although, in many applications of the invention, the continued closure of the upper switch contacts may be ignored as provided by the electrical circuits to be controlled.

Figure 8:
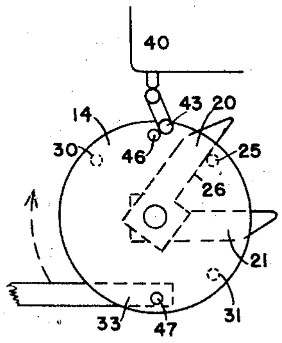
Fig. 8 is a view similar to Figs. 5–7 with the parts shown in their positions during the return of the timing mechanism to the starting position.
Figure 3:
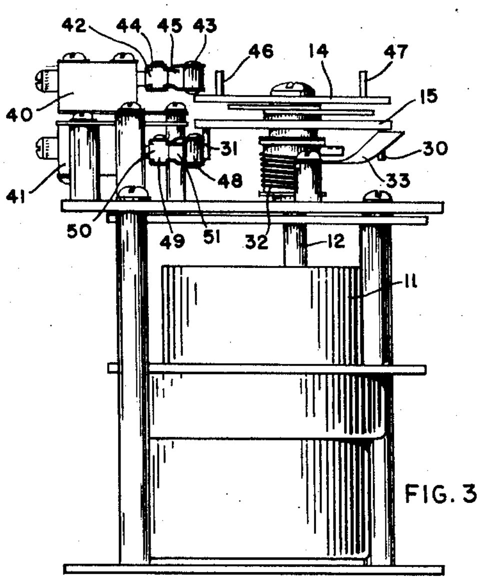
Fig. 3 is a side elevational view of the timing device.
Figure 2:
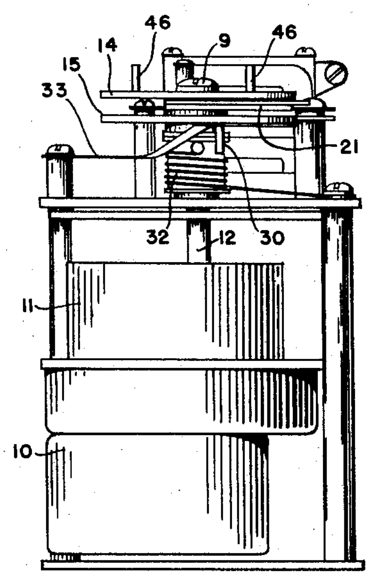
Fig. 2 is a front elevational view of the timing device.
Figure 4:
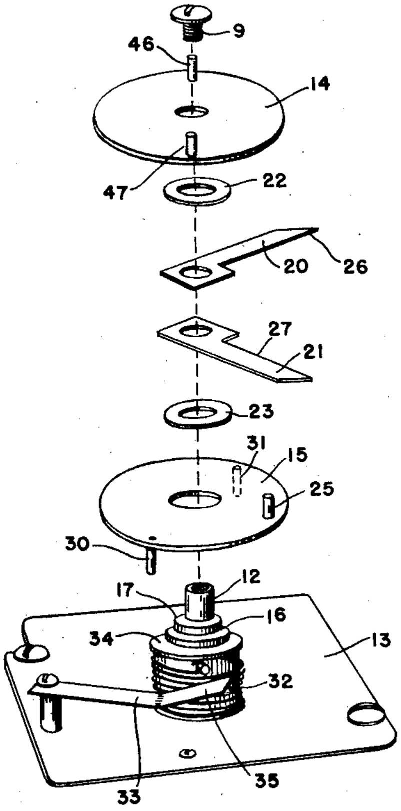
Fig. 4 is a perspective exploded detailed view of the timing cams and lost motion connection therebetween.

At the end of the timing operation, the electric clutch 11 is deenergized to disconnect the clock motor 10 from the timing shaft 12. With the clock motor thus disconnected, the helical spring 32 causes clockwise rotation of the timing shaft 12 and the first timing cam 14. As previously mentioned, the lost motion fingers 20 and 21 are rotated in unison with the first timing cam 14 and the clockwise motion of the timing cam 14 is illustrated by Figure 8 of the drawings with the surface 26 of the lost motion finger 20 contacting the upstanding pin 25 of the second timing cam 15. Thus, both the first timing cam 14 and the second timing cam 15 are rotated in a clockwise direction by the helical spring 32, the second cam 15 being rotated through the lost motion connection until one of the depending pins 30 or 31 of the second timing cam 15 engage the end of the spring stop bar 33 at the reference position, as shown by Figure 5 of the drawings.

By adjusting the angular positions of the lost motion fingers 20 and 21 relative to each other, the elapsed time interval from the starting of the timing operation until the first closure of the electric switch 41 by the operation of its contact roller 48 to produce a first timing pulse may be predetermined. However, due to the lost motion as described above, the interval of time from the starting of the timing operation until the first closure of the contacts of switch 41 will always be different than the elapsed time between the following successive closures of the contacts of switch 41. Similarly, the adjustment of the angular position on the shaft 12 of the upper timing cam 14 and the upstanding pin 46 relative to the switch contact 43 when the timing device is in the starting position, as shown by Figure 5 of the drawings, will adjustably predetermine the elapsed time interval from the start of the timing operation until the closure of the contacts of switch 40 to produce the first control impulse. For example, with the depending pin 30 of the second cam disc 15 engaging the spring stop 33, as shown in Figure 5 of the drawings, and the upstanding pin 25 engaging the surface 26 of the lost motion finger 20, it is apparent that the upstanding pin 46 of the first cam member 14 must move a predetermined angular distance from the starting position in Figure 5 of the drawings to the position shown in Figure 6 of the drawings.

It should be understood that this invention is not limited to the particular form of lost motion connection interposed between the timing shaft and the timing cam since various other forms of lost motion connections may be employed as would occur to anyone skilled in the art. For example, the upstanding pin 25 of the second timing cam 15 may be received in an arcuate slot of the first timing cam 14 and adjustable limit screws may be positioned within such arcuate slot in substitution for the lost motion fingers 20 and 21. Various modifications may be made within the spirit of the invention and the scope of the appended claims.

What is claimed is:

1. A timing device for producing a series of electric impulses in accordance with the passage of time including in combination, a clock motor, a movable element, a clutch operable to connect said motor for moving said element in a first direction, a movable cam, a lost motion connection between said element and said cam for moving said cam with said element in the first direction after a period corresponding to the amount of lost motion, an electric switch, means on said cam for successively closing and opening said switch at regular intervals by the movement of said cam in the first direction, means to prevent movement of said cam in a second direction beyond a predetermined reference position, and means for moving said element in the second direction when said clutch is operated to disconnect said motor and said element, the lost motion connection including means for moving said cam with said element in the second direction back to the reference position for preventing further movement in the second direction by both said cam and said element.

2. A timing device for producing a series of electric impulses in accordance with the passage of time including in combination, a clock motor, a rotatable element, a clutch operable to connect said motor for rotating said element in a first direction, a rotatable cam, a lost motion connection between said element and said cam for rotating said cam with said element in the first direction after a period corresponding to the amount of lost motion, an electric switch, means on said cam for successively closing and opening said switch at regular intervals by the rotation of said cam in the first direction, means to prevent rotation of said cam in a second direction beyond a predetermined reference position, and means for rotating said element in the second direction when said clutch is operated to disconnect said motor and said element, the lost motion connection including means for rotating said cam with said element in the second direction back to the reference position for preventing further rotation in the second direction by both said cam and said element.

3. A timing device for producing a series of electric impulses in accordance with the passage of time including in combination, a clock motor, a first movable cam, a clutch operable to connect said motor for moving said first cam in a first direction, a second movable cam, a lost motion connection between said first and second cams for moving said second cam with said first cam in the first direction after a period corresponding to the amount of lost motion, a first electric switch, means on said first cam for momentarily closing said first switch by the movement of said first cam in the first direction, a second electric switch, means on said second cam for successively closing and opening said second switch at regular intervals by the movement of said second cam in the first direction, means to prevent movement of said second cam in a second direction beyond a predetermined reference position, and means for moving said first cam in the second direction back to the reference position when said clutch is operated to disconnect said motor and first cam, the lost motion connection including means for moving said second cam with said first cam in the second direction back to the reference position for preventing further movement in the second direction by both said first and second cams.

4. A timing device for producing a series of electric impulses in accordance with the passage of time including in combination, a clock motor, a first rotatable cam, a clutch operable to connect said motor for rotating said first cam in a first direction, a second rotatable cam, a lost motion connection between said first and second cams for rotating said second cam with said first cam in the first direction after a period corresponding to the amount of lost motion, a first electric switch, means on said first cam for momentarily closing said first switch by the rotation of said first cam in the first direction, a second electric switch, means on said second cam for successively closing and opening said second switch at regular intervals by the rotation of said second cam in the first direction, means to prevent rotation of said second cam in a second direction beyond a predetermined reference position, and means for rotating said first cam in the second direction back to the reference position when said clutch is operated to disconnect said motor and first cam, the lost motion connection including means for rotating said second cam with said first cam in the second direction back to the reference position for preventing further rotation in the second direction by both said first and second cams.

References Cited in the file of this patent

UNITED STATES PATENTS

| | | |
|---|---|---|
| 1,993,793 | Mead | Mar. 12, 1935 |
| 2,094,060 | Busch | Sept. 28, 1937 |
| 2,096,620 | Robertson | Oct. 19, 1937 |
| 2,202,149 | Gottlieb | May 28, 1940 |
| 2,374,590 | Dunham | Apr. 24, 1945 |
| 2,380,943 | Chapman | Aug. 7, 1945 |
| 2,605,833 | Bliss | Aug. 5, 1952 |
| 2,663,786 | Illian et al. | Dec. 22, 1953 |
| 2,670,039 | Burkholder | Feb. 23, 1954 |